(12) United States Patent
Dougherty

(10) Patent No.: US 6,711,827 B2
(45) Date of Patent: Mar. 30, 2004

(54) CONDUIT BENDING GUIDE

(76) Inventor: Craig J. Dougherty, 106 Glen Ave., Upton, MA (US) 01568

( * ) Notice: Subject to any disclaimer, the term of this patent is extended or adjusted under 35 U.S.C. 154(b) by 0 days.

(21) Appl. No.: 10/007,558

(22) Filed: Nov. 8, 2001

(65) Prior Publication Data

US 2003/0084581 A1 May 8, 2003

(51) Int. Cl.$^7$ .................................................. G01C 9/16
(52) U.S. Cl. .............................. 33/370; 33/371; 33/521
(58) Field of Search .......................... 33/370, 365, 371, 33/372, 373, 376, 390, 391, 395, 397, 399, 412, 529

(56) References Cited

U.S. PATENT DOCUMENTS

| | | | |
|---|---|---|---|
| 1,271,049 A | * 7/1918 | Marshall | 33/370 |
| 2,627,666 A | * 2/1953 | Levrero | 33/395 |
| 2,950,536 A | 8/1960 | Hellwig | |
| 3,060,587 A | 10/1962 | Picken | |
| RE26,467 E | 10/1968 | Lance | |
| 3,707,772 A | * 1/1973 | Cotter | 33/373 |
| 4,164,817 A | * 8/1979 | Walker | 33/371 |
| 4,394,799 A | 7/1983 | Moree et al. | |
| 4,882,850 A | * 11/1989 | Lindsey | 33/760 |
| 4,947,556 A | * 8/1990 | Peil | 33/370 |
| 5,058,407 A | 10/1991 | Parker | |
| 5,154,000 A | 10/1992 | Mahoney et al. | |
| 5,640,774 A | * 6/1997 | Goldman | 33/1 SD |
| 5,912,733 A | * 6/1999 | Dunlop et al. | 33/227 |
| 6,073,356 A | * 6/2000 | Li | 33/373 |
| 6,159,167 A | * 12/2000 | Hardin-Naser | 33/512 |
| 6,385,856 B1 | * 5/2002 | Godin | 33/529 |

OTHER PUBLICATIONS

Greenlee Company, Copy of a page of a Catalog showing "BenderMate System." date unknown.
Greenlee Company, Printout from company's webpage at www.greenlee.textron.com showing "BenderMate System" (same product as the one shown in a copy of a Catalog listed above) date unknown.

* cited by examiner

Primary Examiner—Christopher W. Fulton
(74) Attorney, Agent, or Firm—Lambert & Associates; Gary E. Lambert

(57) ABSTRACT

A conduit bending guide, where in a preferred embodiment, the guide has a base a member with a first base section and a second base section with means for repositioning of the two base sections with respect to each other, a fastening member for securing of the guide to a conduit, a suspension mount housing an angle indicator, and a bend angle indicator. The angle indicator could have various degrees of freedom of rotation in space as it is supported by a suspension means of the suspension mount. The guide allows making of consecutive co-planar bends in a conduit by observation of the reading on the angle indicator. By observing the angle indicator, it is also possible to make consecutive out-of-plane bends with a desired angle of deviation from the plane established by any one bend in the conduit. The degree of a bend along the longitudinal axis of the conduit is measured by the bend angle indicator or by realignment of the angle indicator.

32 Claims, 3 Drawing Sheets

CONDUIT BENDING GUIDE

FIELD OF THE INVENTION

This invention relates to guides used in bending of conduits, wherein the guides are used to ensure coplanar bends in a conduit.

One of the problems encountered in bending of the conduits is ensuring of a co-planar alignment of two or more bends made on the same conduit. To make co-planar bends, the bends are usually made in a consecutive order, one bend after another. Making of the first bend establishes a two dimensional plane within which the conduit lies. Oftentimes, there exists a need to make a second bend at another section of the conduit with such second bend lying in the same plane as the first bend, i.e. with bends being co-planar. In a workshop or in the field, the co-planar bends are frequently made with nothing more than a sharp eye of a skilled worker to ensure a proper resultant configuration. Mistakes in making of co-planar bends could be very costly since some conduits are relatively expensive and correction of the improper out-of-plane bends is frequently not feasible.

There exists prior art aimed at ensuring obtainment of co-planar bends. Particularly there are two patents, a U.S. Pat. No. 4,394,799 issued to Moree et al, on Jul. 26, 1983 and a U.S. Pat. No. 5,154,000 issued to Mahoney et al, on Oct. 13, 1992. These patents describe devices that attach to the end of a conduit with the bubble level indicator positioned on the device. The bubble level is used to properly align the conduit before making of a second bend. These patents also describe an angle indicator for display of the angle of the bend itself. However, these inventions cannot display an out of plane angle, i.e. the angle of deviation from a plane. Not all consecutive bends in a conduit have a requirement of being co-planar. At times it is desirable to have a specific angle out-of-plane second bend, so as to properly align a conduit in the mechanism where it will be installed. However, these patents do not disclose such a capability.

What is needed is a guide for bending pipes and conduits which would allow for making of the co-planar consecutive bends as well as for measuring an angle of the out-of-plane consecutive bends.

SUMMARY OF THE INVENTION

The present invention represents a conduit bending guide for measuring angle of bends in a conduit. One wide application of the present invention is to ensure co-planar bends in a conduit. Another application is to measure an out-of-plane angle of a bend in a conduit. Additionally, the disclosed invention also allows to measure two angles for each bend, the angle of a bend in relation to the longitudinal axis of the conduit and an out-of-plane angle of a bend.

The term conduit is used here broadly to describe pipes, moldings, struts, bars, raceways, wireways, and other oblong objects. Furthermore, although conduits commonly have a round medial cross-section, the disclosed invention could be applied to conduits that have medial cross-section of practically any shape.

In one embodiment, the guide is comprised of an angle indicator, a suspension mount housing the angle indicator, and a fastening member for attaching the guide to a conduit. The guide could be attached to the end of a conduit or to a side of a conduit depending on the type and versatility of the utilized fastening member. The angle indicator could be rotated in space with varying degrees of freedom of rotation depending on the type of suspension mount used.

The guide is attached to a conduit and the conduit is positioned in a conventional conduit bending device. The operator adjusts the angle indicator to lie in a plane that is perpendicular to the longitudinal axis of the conduit. The operator notes the reading on the angle indicator and makes the first bend. Before the second bend is made, the operator aligns the conduit in the conduit bending device and observes the angle indicator to either insure a co-planar bend or to make a certain angle of an out-of-plane bend.

The angle indicator could also be used to measure the angle of a bend along the longitudinal axis of the conduit. For that purpose, the angle indicator is realigned within the suspension mount to lie in the same plane as the longitudinal axis of the conduit. The operator could then observe the reading on the angle indicator as the conduit is bent.

In another embodiment, the guide is comprised of a base member, a suspension mount housing an angle indicator, and a fastening member. This embodiment differs in that it has a base member which allows for greater flexibility in capabilities of the guide, capabilities which are explained below.

In this embodiment, the angle of the bend along the longitudinal axis of the conduit could be measured with a bend angle indicator, which is affixed to the base member. Therefore, now operator can view two separate indicators to observe the degrees of each bend, the angle indicator and the bend angle indicator.

The base member could be detached from the suspension mount if there is a need to set aside a conduit and then come back to it later and make consecutive bends. Since the fastening member will remain affixed to the conduit, upon re-attachment of the base member, the orientation of the guide to the conduit is identical to that prior to detachment of the base member.

In another embodiment, the base member is subdivided into a first base section and a second base section with means for realignment of the first and second base sections with respect to one another. The first base member is affixed to the conduit, while the second base member houses the angle indicator and an optional bend angle indicator. This arrangement allows to measure bends in smaller diameter conduits. As the conduit is realigned in the bending machine, the guide may be in the way of placement of the conduit flat on the bench. Having means for realignment of the first and second base sections with respect to one another allows to move out of the way the bulkier second base section which houses the angle indicator.

In yet another embodiment, the angle indicator could be a bubble level. This embodiment could be used when the only requirement for the consecutive bends is to be co-planar with the first bend. Here the only angle that the angle indicator could show is one of a 0° of deviation from the plane of the conduit.

Therefore, it is an object of the present invention to provide an improved conduit bending guide that indicates the degree of the out-of-plane bend of consecutive bends in a conduit.

It is another object of the present invention to provide an improved bending guide that indicates the degree of the bend along the longitudinal axis of the conduit.

It is another object of the present invention to provide an improved bending guide that has a certain degree of freedom for rotation of the angle indicator so as to allow easier observation of the angle indicator. This feature also allows the operator to attach the guide only once to the conduit and let it remain attached at the same part of the conduit while consecutive bends are made on the conduit.

It is another object of the present invention to provide an improved bending guide that could be secured to the inner wall surface of the conduit with no part of the guide protruding beyond the outer circumference of the conduit. This feature allows the operator to place the conduit on the flat surface with the guide attached without damaging the guide.

These and other objects and advantages of the present invention will be more apparent by reference to the following description of the invention, description of a preferred embodiment, appended claims, and accompanying drawings.

DESCRIPTION OF THE INVENTION

This invention represents a conduit bending guide.

Figure 1:
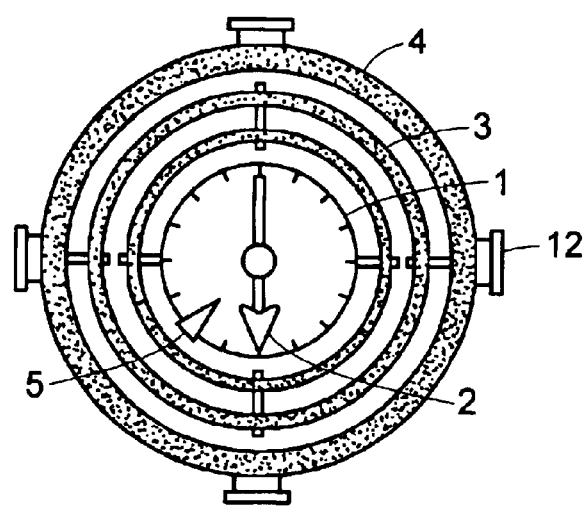
FIG. 1 is a front view of one of the embodiments of the conduit bending guide.
Figure 2:
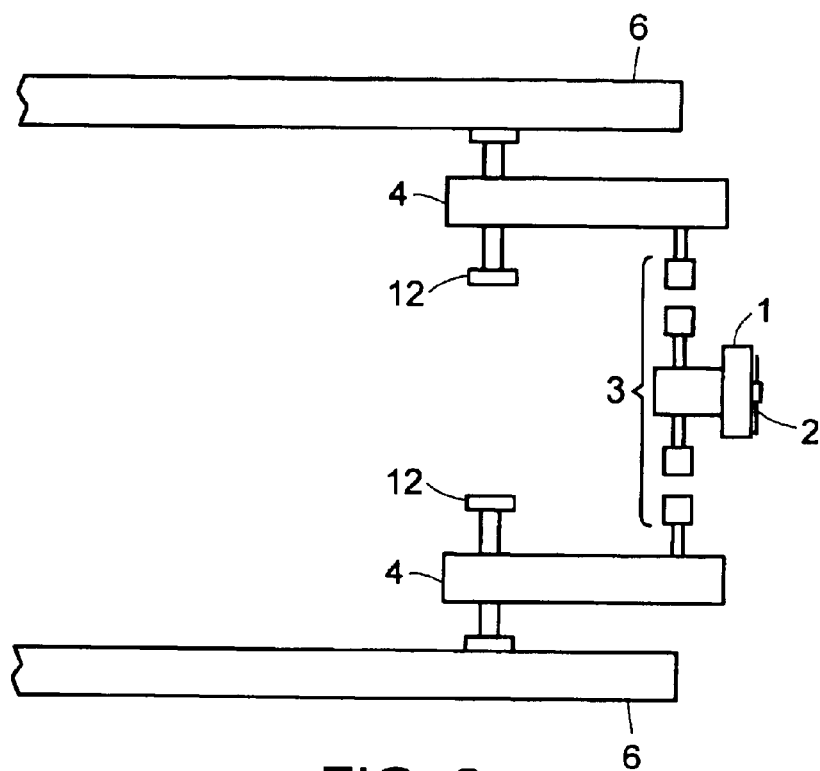
FIG. 2 is a side cross sectional view of one of the embodiments of the conduit bending guide attached to a conduit.

One of the embodiments of the guide is shown in FIGS. 1 & 2. A suspension mount 3 houses an angle indicator 1 while fastening member 4 is attached to the suspension mount 3 and secures the guide to a conduit 6. The angle indicator 1 has a first gravity sensitive angle indicating means 2 well known in the art such as a pendulum clinometer 2. A first angle marker 5 is slidably attached to the periphery of the angle indicator 1 for marking desired angle of a second bend with relation to the plane of the first bend.

The suspension mount 3 houses the angle indicator 1 and the suspension mount 3 can have a variety of well known in the art suspension means for allowing varying degrees of rotational freedom to the angle indicator 1. One possible suspension means is a hoop in a hoop shown in FIGS. 1 & 2. The suspension means could allow rotation of the angle indicator 1 only along the horizontal axis, only along the horizontal and vertical axes, or allow free rotation of the angle indicator 1 in a three dimensional space wherein the angle indicator 1 could assume any possible orientation. This allowance for varying degrees of rotational flexibility of the angle indicator 1 allows for achievement of four separate goals. One goal is to allow for convenient observation of the angle indicator 1 by an operator when the bend in the conduit positions the portion of the conduit with the guide attached to it away from the direct field of view of the operator. Another goal is to allow the first gravity sensitive angle indicating means 2 to indicate vertical axis, especially when the first gravity sensitive angle indicating means 2 is a pendulum clinometer 2. The third goal achieved with the suspension means is an ability to attach the guide to the conduit 6 only once and then perform a series of bends without repositioning of the guide. The operator can attach the guide to the conduit and use the guide to reference the desired angle of a bend for each bend, regardless of the re-orientation of that portion of the conduit to which the guide is attached, since the angle indicator 1 could be rotated for observation by the operator. Lastly, the angle indicator 1 could be aligned to show angle of a bend along the longitudinal axis of the conduit by simply turning the angle indicator 1 within the suspension mount 3.

A fastening member 4 could use a variety of well know in the art fastening means to attach the guide to the conduit. One example is to have a fastening means similar to the one depicted in FIGS. 1 & 2 wherein adjustable clamps 12 allow securing of the guide to either the inside or the outside surface of the conduit 6. The advantage of having a capability to secure the guide to the inside surface of the conduit 6, as shown in FIG. 2, is that the operator could safely place the conduit on a flat surface such as a floor or a shelf without damaging the guide. Thus the operator could make one or more bends to one piece of conduit at one time and then place the conduit away with the guide still attached to it. Then, at a later time, the operator could proceed with making additional bends to that same conduit with an assurance that all of the consecutive bends are made at the desired angle to the plane of one of the earlier made bends. However, other type of fastening means could be used, such as a clamp or any other type of well known in the art fastening means. Also, the fastening means could attach the guide to the conduit either at an end point of a conduit or anywhere along the length of the conduit.

An additional feature could be added where the suspension mount 3 could be detached from the fastening member 4. This feature is useful if there is a need to store away the conduit before completion of all of the desired bends. Retaining of the fastening member 4 on the conduit allows for identical re-alignment of the guide to the conduit at a later date when consecutive bends are made.

To use the guide, the first bend is made in the conduit with the operator marking the angle on the angle indicator 1 with the first angle marker 5. With the pendulum clinometer 2 as the first gravity sensitive angle indicating means 2, the pendulum clinometer 2 would point downward. Then the conduit is re-aligned in the conventional bending device for making of a second bend. Now the operator could make a co-planar second bend with the pendulum clinometer 2 pointing either at the first angle indicator 5 reading or at a reading that is at 180° to the first angle indicator 5 reading depending on the direction of the second bend. If the operator needs to make the second bend as an out-of-plane bend, then the conduit is rotated around its longitudinal axis until the desired out-of-plane angle is indicated by the pendulum clinometer 2 on the angle indicator 1. Thus, the operator could use the described conduit bending guide to consistently make either co-planar or measured out-of-plane consecutive bends in a conduit.

Figure 3:
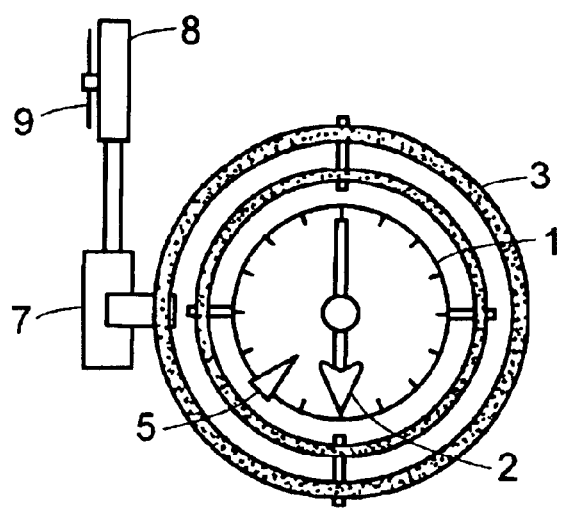
FIG. 3 is a front view of one of the embodiments of the conduit bending guide having a base member and a bend angle indicator.
Figure 4:
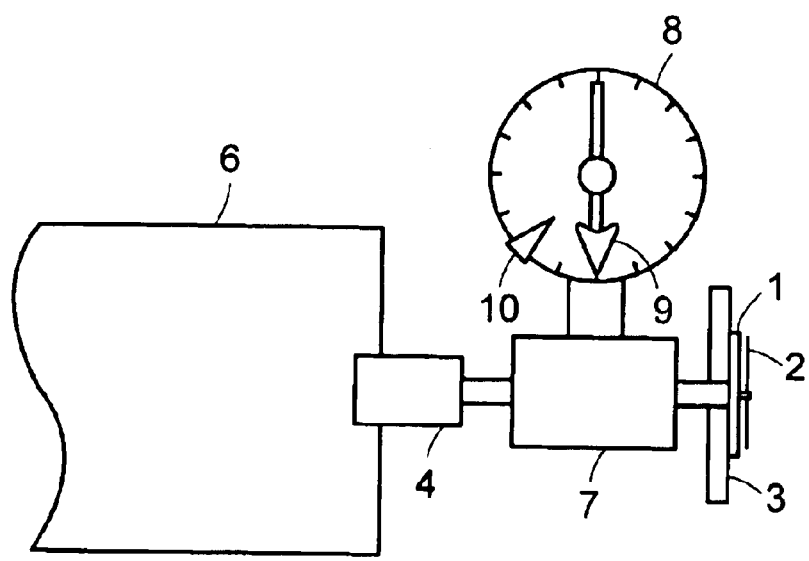
FIG. 4 is a side view of one of the embodiments of the conduit bending guide attached to a conduit and having a base member and a bend angle indicator.

In another embodiment of the invention shown in FIGS. 3 & 4, the guide has a base member 7, the suspension mount 3, and the fastening member 4. Optional bend angle indicator 8 could be affixed to the base member 7. The bend angle indicator 8 has a second gravity sensitive angle indicating means 9 and a second angle marker 10. The second gravity sensitive angle indicating means 9 could be any of the well known in the art gravity sensitive angle indicating means, such as a pendulum clinometer.

The bend angle indicator 8 could be used to measure the angle of a bend along the longitudinal axis of the conduit. The second angle marker 10 is slidably attached to the periphery of the bend angle indicator 8 for notation of the desired angle of the bend. This feature allows operator to simultaneously observe the angle of the out-of-plane bend on the angle indicator 1 and the angle of the bend along the longitudinal axis of the conduit by observing the bend angle indicator 8.

When only co-planar bends are desired, the angle indicator 1 could be a bubble level, while the bend angle indicator is used to observe the angle of a bend along the longitudinal axis of the conduit.

DESCRIPTION OF THE PREFERRED EMBODIMENT

Figure 5:
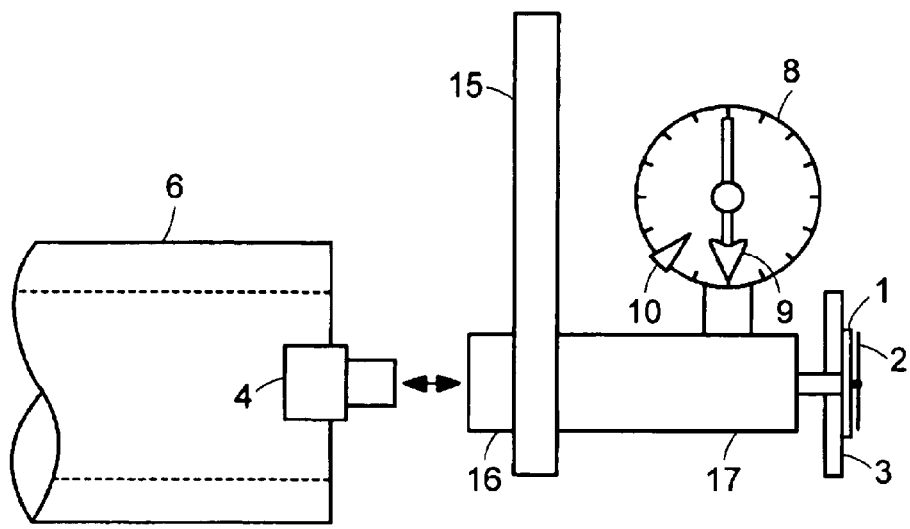
FIG. 5 is a side view of one of the embodiments of the conduit bending guide having a slide mount and depicted as detached from the fastening member.
Figure 6:
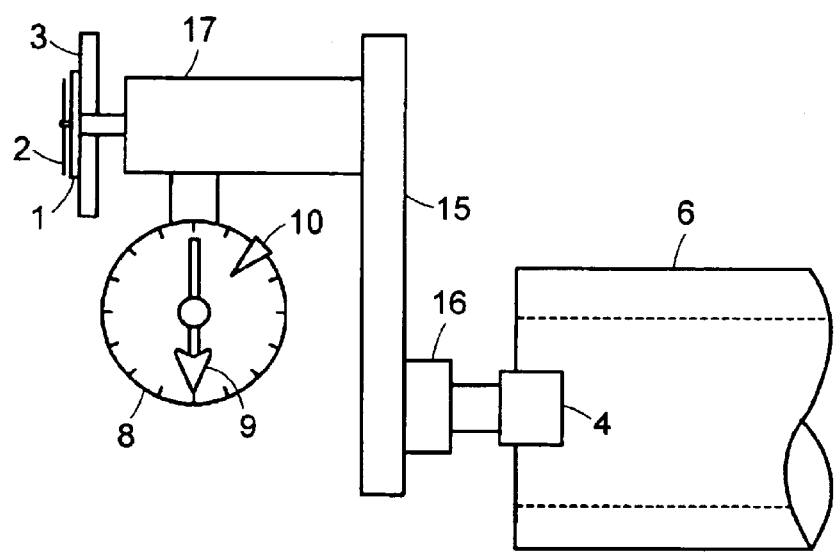
FIG. 6 is a side view of one of the embodiments of the conduit bending guide having a slide mount and depicted as attached to the fastening member.

In the preferred embodiment of the invention, shown in FIGS. 5 & 6. The base member 7 has a first base section 16 and a second base section 17. The first base section 16 could be attached to and detached from the fastening member 4. The second base section 17 has the suspension mount 3 with the angle indicator 1 attached to it. Also attached to the second base section 17 is the bend angle indicator 8. The first 16 and second base 17 sections have means for adjusting their position and distance from each other. Such means could be any number of means well known in the art such as a slide mount 15 depicted in FIGS. 5 & 6.

As described earlier, having a capability to detach the guide from the fastening member 4 allows for storing away of the conduit for a later day when consecutive bends are to be made. Retaining of the fastening member 4 on the conduit ensures same alignment of the guide on the conduit.

Another advantage of the preferred embodiment is that it could be used even on conduits with a cross sectional diameter that is smaller than the width of the guide. As the conduit is realigned for various consecutive bends inside of the bending machine, the bend angle indicator 8 may come into danger of being crashed when the end of the conduit with the guide attached to it is placed on a flat surface. Having means to move the guide aside while retaining its alignment with respect to the conduit allows to fully utilize the guide without a possibility of having it crashed against the bench or other flat surface.

What is claimed is:

1. An apparatus for measuring bends in conduits, comprising:
   an angle indicator having a first gravity sensitive angle indicating means;
   a suspension mount, housing the angle indicator;
   a fastening member attached to the suspension mount, having a means for affixing of the fastening member to a conduit; and
   the fastening member has means for attachment of the fastening member to an inner surface alone of the conduit at an end portion of the conduit.

2. The apparatus of claim 1 further comprising:
   a first angle marker attached to the angle indicator, wherein the first angle marker could be selectively positioned along a periphery of the angle indicator.

3. The apparatus of claim 1 further comprising:
   means for attachment of the suspension mount to the fastening member, wherein the suspension mount is detachable from the fastening member.

4. The apparatus of claim 1 wherein:
   the suspension mount has a suspension means which allows rotation of the angle indicator along the horizontal axis.

5. The apparatus of claim 1 wherein:
   the suspension mount has a suspension means which allows rotation of the angle indicator along the horizontal and vertical axes.

6. The apparatus of claim 1 wherein:
   the suspension mount has a suspension means enabling the angle indicator to rotate in any direction and assume any orientation in a three dimensional space.

7. The apparatus of claim 1 wherein:
   the suspension mount has a suspension means enabling the angle indicator to be positioned and viewed for purposes of measuring an angle of a bend along the longitudinal axis of the conduit.

8. The apparatus of claim 1 wherein:
   the fastening member has a second means for attachment of the fastening member to an outer surface of the conduit at an end portion of the conduit.

9. The apparatus of claim 1 wherein:
   the fastening member has a second means for attachment of the fastening member to an outer surface of the conduit along the length of the conduit.

10. The apparatus of claim 1 wherein:
    the means for attachment of the fastening member is at least one clamp.

11. An apparatus for measuring bends in conduits, comprising:
    a base member;
    a suspension mount coupled to the base member, the suspension mount housing an angle indicator, wherein the angle indicator has a first gravity sensitive angle indicating means;
    a fastening member attached to the suspension mount, having a means for affixing of the fastening member to a conduit; and
    the fastening member has means for attachment of the fastening member to an inner surface alone of the conduit at an end portion of the conduit.

12. The apparatus of claim 11 further comprising:
    a first angle marker attached to the angle indicator, wherein the first angle marker is be selectively positioned along a periphery of the angle indicator.

13. The apparatus of claim 11 further comprising:
    a bend angle indicator affixed to the base member, the bend angle indicator having a second gravity sensitive angle indicating means.

14. The apparatus of claim 13 further comprising:
    a second angle marker attached to the bend angle indicator, wherein the second angle marker is selectively positioned along a periphery of the bend angle indicator.

15. The apparatus of claim 11 further comprising:
    means for attachment of the base member to the fastening member, as well as for detachment of the base member from the fastening member.

16. The apparatus of claim 11 wherein:
    the base member has a first base section and a second base section, wherein the first base section is affixed to the fastening member and the second base section is affixed to the suspension mount.

17. The apparatus of claim 16 further comprising:
    means for attachment of the first base section to the fastening member, as well as for detachment of the first base section from the fastening member.

18. The apparatus of claim 16 wherein:
a bend angle indicator is affixed to the second base section, the bend angle indicator having a second gravity sensitive angle indicating means.

19. The apparatus of claim 18 further comprising:
a second angle marker attached to the bend angle indicator, wherein the second angle marker could be selectively positioned along a periphery of the bend angle indicator.

20. The apparatus of claim 11 wherein:
the suspension mount has a suspension means which allows rotation of the angle indicator along the horizontal axis.

21. The apparatus of claim 11 wherein:
the suspension mount has a suspension means which allows rotation of the angle indicator along the horizontal and vertical axes.

22. The apparatus of claim 11 wherein:
the suspension mount has a suspension means enabling the angle indicator to rotate in any direction and assume any orientation in a three dimensional space.

23. The apparatus of claim 11 wherein:
the suspension mount has a suspension means enabling the angle indicator to be positioned and viewed for purposes of measuring an angle of a bend along the longitudinal axis of the conduit.

24. The apparatus of claim 11 wherein:
the fastening member has a second means for attachment of the fastening member to an outer surface of the conduit at an end portion of the conduit.

25. The apparatus of claim 11 wherein:
the fastening member has a second means for attachment of the fastening member to an outer surface of the conduit along the length of the conduit.

26. The apparatus of claim 11 wherein:
the means for attachment of the fastening member is at least one clamp.

27. An apparatus for measuring bends in conduits, comprising:
base member having a first base section and a second base section, wherein the first base section is affixed to a fastening member and the second base section is affixed to a suspension mount;
means for adjustment of position and distance of the second base section in relation to the first base section;
the suspension mount coupled to the base member, the suspension mount housing an angle indicator, wherein the angle indicator has a first gravity sensitive angle indicating means;
the fastening member affixed to the base member and having means for affixing of the fastening member to a conduit.

28. An apparatus of claim 27 wherein:
a slide mount is the means for adjustment of position and distance of the second base section in relation to the first base section.

29. An apparatus for measuring bends in conduits, comprising:
an angle indicator having a first gravity sensitive angle indicating means;
a suspension mount, housing the angle indicator;
a fastening member attached to the suspension mount, having a means for affixing of the fastening member to a conduit; and
the suspension mount has a suspension means enabling the angle indicator to rotate in any direction and assume any orientation in a three dimensional space.

30. The apparatus of claim 28 wherein
the suspension means enabling the angle indicator to rotate 360 degrees along any axis and assume any orientation in a three dimensional space.

31. An apparatus for measuring bends in conduits, comprising:
a base member;
a suspension mount coupled to the base member, the suspension mount housing an angle indicator, wherein the angle indicator has a first gravity sensitive angle indicating means;
a fastening member attached to the suspension mount, having a means for affixing of the fastening member to a conduit; and
the suspension mount has a suspension means enabling the angle indicator to rotate in any direction and assume any orientation in a three dimensional space.

32. The apparatus of claim 31 wherein:
the suspension means enabling the angle indicator to rotate 360 degrees along any axis and assume any orientation in a three dimensional space.

* * * * *